United States Patent [19]

Smith-Horn et al.

[11] Patent Number: 5,009,461
[45] Date of Patent: Apr. 23, 1991

[54] VEHICLE DOOR PIVOTED SIDE GLASS

[75] Inventors: Garry R. Smith-Horn, Utica; Robert J. Wendt, Keego Harbor, both of Mich.

[73] Assignee: General Motors Corporation, Detroit, Mich.

[21] Appl. No.: 200,225

[22] Filed: May 31, 1988

[51] Int. Cl.⁵ .............................. B60J 1/14; B60J 5/04
[52] U.S. Cl. ........................................ 296/146; 49/502
[58] Field of Search ................ 296/146, 201; 49/72, 49/324, 502

[56] References Cited

U.S. PATENT DOCUMENTS

| | | | |
|---|---|---|---|
| 2,815,977 | 12/1957 | Podolan | 296/146 |
| 4,241,542 | 12/1980 | Podolan et al. | 49/352 |
| 4,571,884 | 2/1986 | Hetman et al. | 296/146 X |

FOREIGN PATENT DOCUMENTS

| | | | |
|---|---|---|---|
| 3341922 | 6/1985 | Fed. Rep. of Germany | 296/146 |
| 26626 | 2/1983 | Japan | 296/201 |

Primary Examiner—Dennis H. Pedder
Attorney, Agent, or Firm—William A. Schuetz

[57] ABSTRACT

A vehicle door assembly which is hingedly connected to a side pillar of an automotive vehicle and which includes an operating mechanism for automatically pivoting a side window of the door assembly from an inner severely inwardly sloped position toward an outer generally vertical position in response to movement of the door assembly from a closed position toward an open position so as to permit easy entrance into exit from the vehicle.

5 Claims, 2 Drawing Sheets

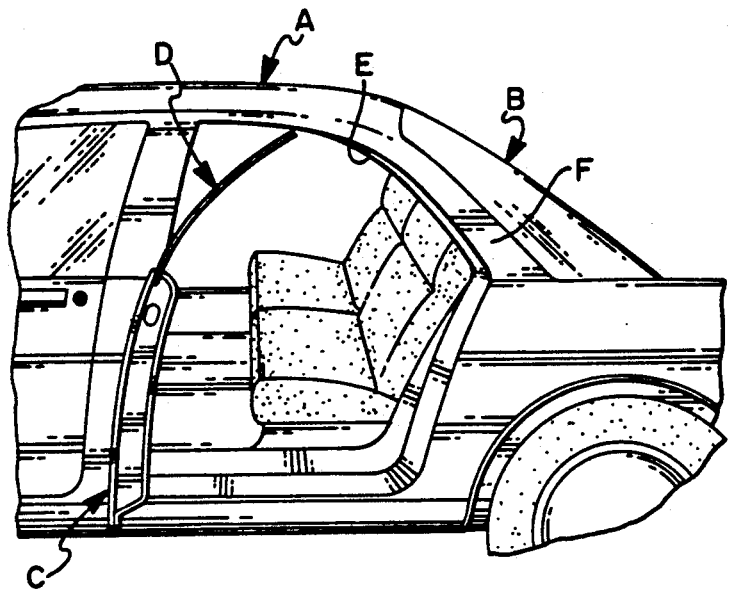
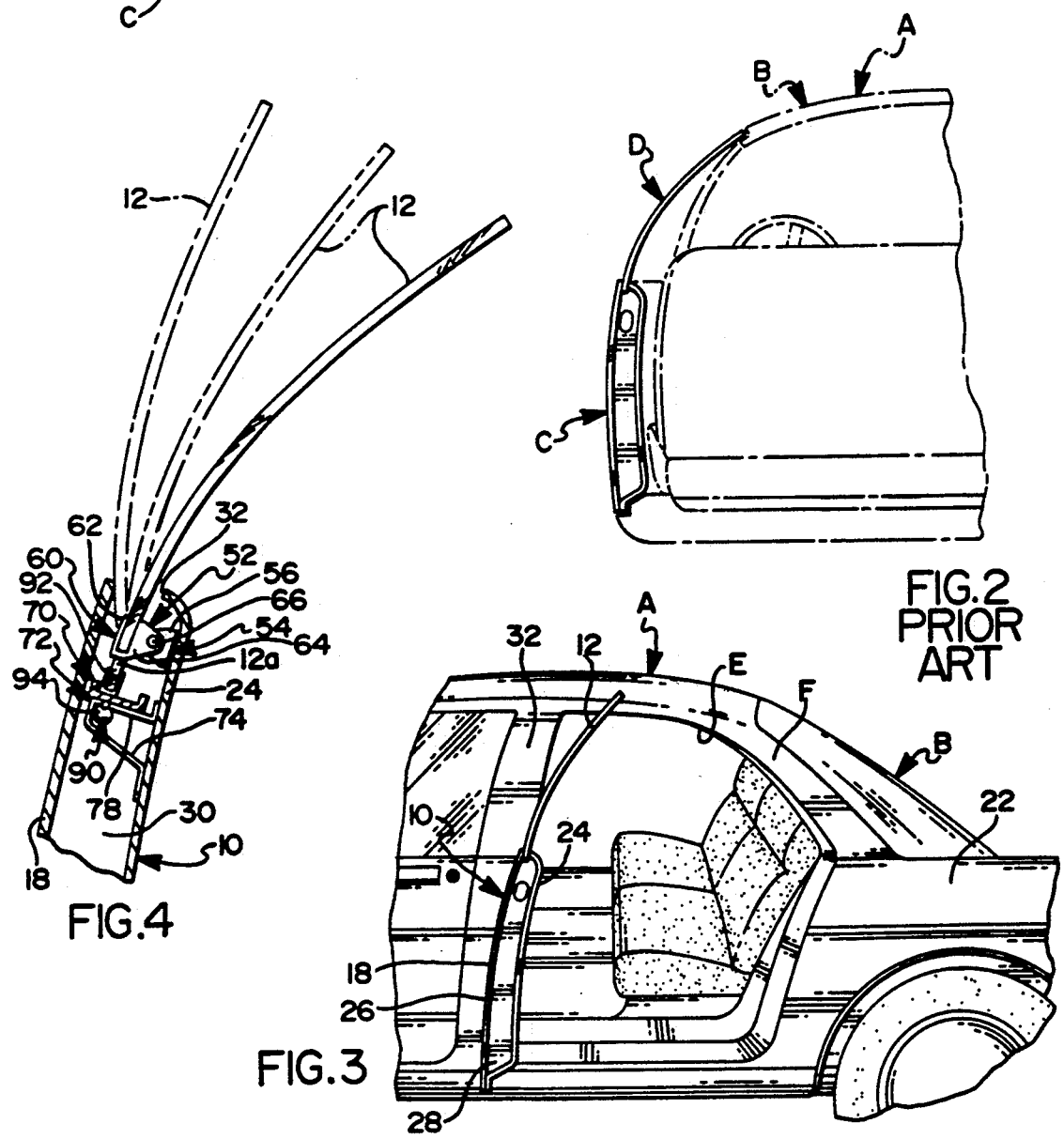
FIG. 1 PRIOR ART
FIG. 2 PRIOR ART
FIG. 3
FIG. 4

VEHICLE DOOR PIVOTED SIDE GLASS

The present invention relates to a vehicle door assembly and more particularly, to a vehicle door assembly having a window which is sloped severely inwardly when the door assembly is closed, but which automatically pivots outwardly as the door is opened to provide headroom for exit from and entry into the vehicle.

Certain vehicles, for design or aesthetic reasons, are given a generally bullet shaped appearance. In such vehicles, it is also desirable to provide side doors having windows with severe tumble home, i.e. which are sloped severely inwardly from the door beltline toward the adjacent roofline. Although these designs are aesthetically pleasing and aerodynamic, the severe inwardly sloping side window or door glass, especially when used in rear door assemblies, restricts the amount of headroom and thus, makes entry into and exit from the vehicle more difficult.

To overcome the above-noted objection when using a door assembly having severe tumble home window glass, i.e., severely inwardly sloped window glass, the present invention provides a door assembly which has a window pivotally supported for movement between an inner sloped position and an outer generally vertical position and which has an operating mechanism operatively connected with the vehicle body structure or door hinge and with the window glass, and which functions in response to opening movement of the door to automatically move the window glass from its inner sloped position towards an outer, generally vertically disposed position to permit easy exit from and entry into the vehicle.

Accordingly, it is a broad object of the present invention to provide a new and improved door assembly in which a side window glass therefor is automatically pivoted from an inner severely inwardly sloping position toward an outer generally vertical position in response to movement of the door assembly from a closed position toward an open position.

Another object of the present invention is to provide a new and improved door assembly, as defined in the next preceding object, and in which the door assembly includes a totally mechanical operating mechanism which is operatively connected with the door hinge assembly and operatively connected with the window to cause the latter to be pivoted.

Yet another object of the present invention is to provide a new and improved vehicle door assembly, as defined in the next preceding object, and in which the operating mechanism is of a simple, economical and reliable construction having a minimum number of parts.

Another object of the present invention is to provide a new and improved vehicle door assembly, as defined in the preceding objects, and wherein the side window at horizontally spaced locations is pivotally connected by a pivot means to a door panel for generally horizontal movement.

FIG. 1 shows a conventional door assembly with a side window in its open position;

FIG. 2 is a fragmentary phantom line rear elevational view of the vehicle shown in FIG. 1, but showing its door assembly in solid lines and in its closed position;

FIG. 3 is a side elevational view like that shown in FIG. 1, but showing the novel door assembly of the present invention in its open position;

Figure 5:
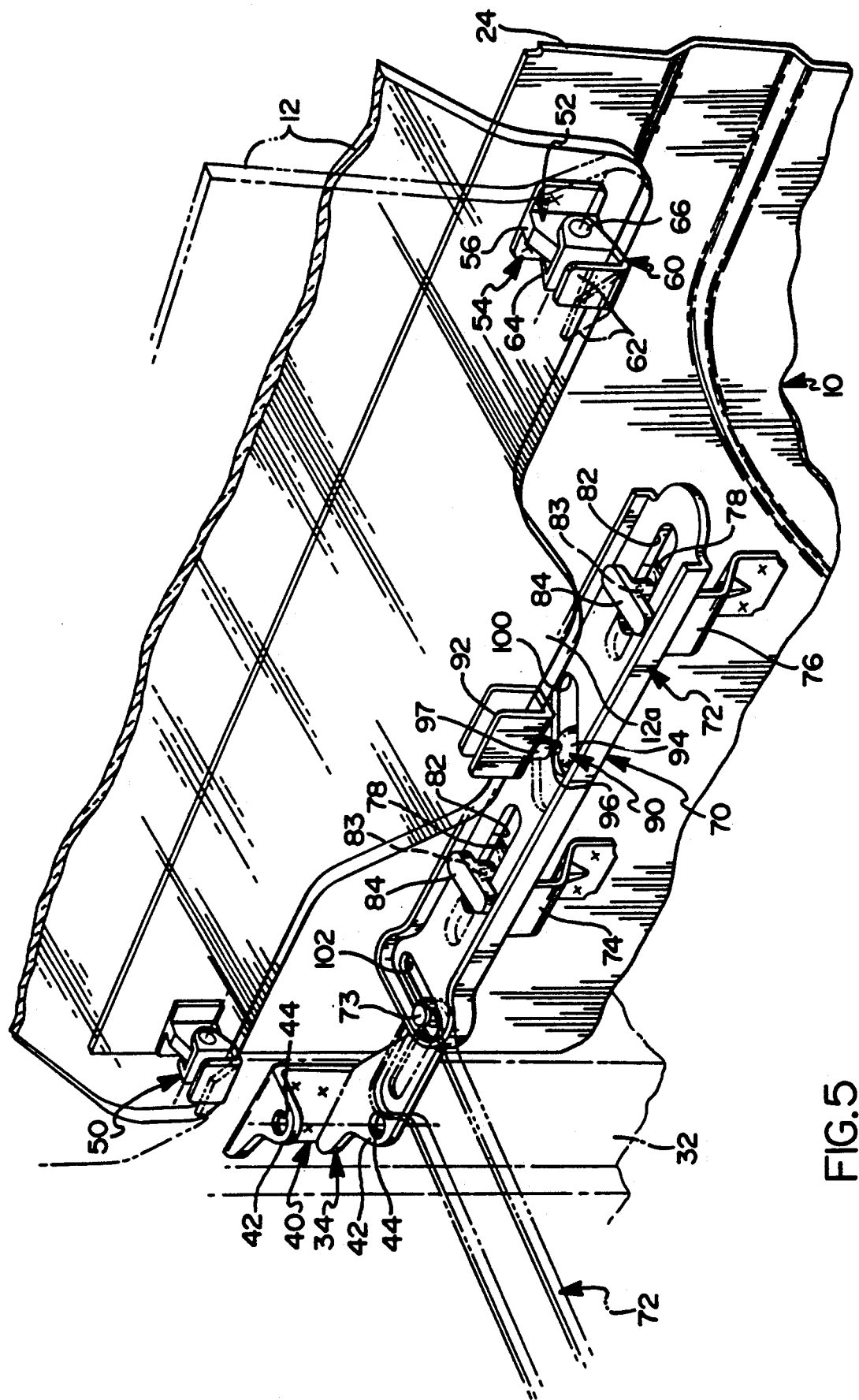

FIG. 4 is a fragmentary vertical cross sectional view of part of the door assembly shown in FIG. 3, but showing the different positions of the side window as the door assembly is moved between its closed and open positions; and FIG. 5 is an enlarged fragmentary perspective view of part of the door assembly shown in FIGS. 3 and 4, but which illustrates an operating mechanism for pivoting the side window between its door open and door closed positions.

Many of the currently designed automotive vehicles have an overall body appearance which is rounded or bullet shaped. FIGS. 1 and 2 illustrate a conventional vehicle A having such a shape. The vehicle A has a rearward roofline and glass, designated generally by reference numeral B, which is severely sloped and has side doors C and side glass D which are on a large radius or rounded so that the vehicle A proceeding from the roofline B toward the lower body has a smooth outwardly curved appearance, as best shown in FIG. 2.

While such styling or design may be aerodynamically desirable and have a pleasing appearance, it nevertheless makes it somewhat difficult when a side door is moved to an open position to enter the vehicle without bending and crouching down to avoid interference between the head of the passenger and the side window D. This is especially so in rear doors where entry room is further reduced due to the severe slope of the back B of the vehicle A. As can be seen in FIG. 1, the severe inward slope or tumble home of the glass D is located in the path of the opening E in the side body structure F of the vehicle A.

To overcome such difficulties, the present invention, as best shown in FIGS. 3–5, provides a novel door assembly 10 having a curved or rounded side window 12 which is automatically pivoted from an inner closed position, as shown by the solid lines in FIG. 4 toward an outer open door position, as shown by the leftmost phantom lines in FIG. 4, in response to movement of the door assembly 10 from a closed position, toward an open position, as shown in FIG. 3. The window 12, when the door is in its closed position, has a severe tumble home, i.e., a severely inwardly sloped orientation, which is the same as that of the conventional window D, as shown in FIGS. 1 and 2, in which the window 12 would be flush with the roofline 14 of the vehicle A and substantially flush with an outer door panel 18 of the door assembly 10 when the door assembly 10 is in its closed position. However, when the door assembly 10 is moved from its closed position toward its open position, the window 12 is caused to be pivoted outwardly and assume the leftmost phantom line position shown in FIG. 3 when the door assembly 10 is in its fully open position. In this position, the window 12 has a generally vertical disposition and provides considerably more headroom for entry into and exit from the vehicle through the opening E in the side body structure 22 of the vehicle A.

The novel door assembly 10, except as noted hereafter, would be similar to the conventional door assembly C in that it would comprise a door body having an inner panel 24, the outer panel 18, a front end or panel (not shown) and a rear end or panel 28 which are suitably welded together to define a well 30 having a top opening 32. The door assembly 10 at its front end is suitably, hingedly connected to a door pillar 32 comprising part of a body structure F of the vehicle A which defines the door opening E. The door 10 is hingedly connected to the pillar 32 via suitable or conventional hinge means 34 which would include a hinge bracket 40 which is suitably welded to the pillar 32 and which has a pair of spaced ears 42 provided with openings 44. The door assembly 10, at its front end, would have a complementary hinge bracket (not shown) welded or suitably secured thereto which would mate with the bracket 40 and which would be pivotally connected thereto via a hinge pin (not shown) extending through the openings 44 of the hinge bracket 40.

The door assembly 10 supports the window 12 for pivotal movement between inner and outer positions, as shown by the solid and phantom lines in FIG. 4, via pivot means 50 and 52. The pivot means 50 is located adjacent the forward edge of the window 12 and the pivot means 52 is located adjacent the rearward edge of the window 12. Since both the pivot means 50 and 52 are of identical construction, only the rearmost pivot means 52 will be described in detail.

The pivot means 52 comprises a bracket 54 which is suitably welded to the inner panel 24 of the door assembly 10 and which includes an ear 56 extending transversely of the inner panel 24. The pivot means 52 further comprises a retainer bracket 60 having a first U-shaped portion 62 which straddles the lower edge of the glass and is suitably adhesively secured thereto and which has a second U-shaped portion 64 which straddles both sides of the ear 56. The U-shaped portion 64 is pivotally connected to the ear 56 via a pivot pin means 66. The pivot means 50 and 52 support the window 12 for movement about a generally horizontal axis extending longitudinally of the vehicle A.

The window 12 is caused to be pivotally moved between its inner and outer positions by an operating mechanism 70 which is operatively with the window 12 intermediate its forward and rearward edges and which is operatively connected with a pivot means 73 carried by the hinge bracket 40 mounted on the pillar 32 of the body structure F of the vehicle A. The operating mechanism 70 includes a one piece slide or guide track 72, which is U-shaped, as viewed in cross section, and which is slidably supported on a pair of spaced brackets 74 and 76 suitably welded or otherwise secured to the inner panel 24 of the door assembly 10. The brackets 74 and 76 are generally hat shaped and define a pair of horizontally spaced surfaces or shelves 78 which slidably support the track 72 for linear movement relative thereto and longitudinally of the vehicle A.

To slidably support the guide track 72 for linear movement longitudinally of the door assembly 10, the guide track 72 is provided with a pair of spaced, linearly extending through slots 82 which are located above threaded openings 83 in the shelves 78 in the brackets 74 and 76. Suitable T-shaped fasteners 84 are threadably connected to the threaded openings 83. The T-shaped fasteners overlie the top surface of the track 72 to retain the track against undue vertical movement, but are threadably secured to the shelves 78 in a manner such as to allow free sliding movement of the track 72 longitudinally of the door assembly 10.

The window 12 at a downwardly projecting lower end portion 12a located intermediate its forward and rearward edges is operatively connected with the slide track 72 via a ball fixture 90 and a U-shaped sash 92. The U-shaped sash 92 straddles the lower edge of the glass and is suitably adhesively secured thereto. The ball fixture 90 includes a spherical ball 94 and a stem 96 having a threaded end which is threadably secured within a threaded opening in a bushing 97 secured to the lower end of the sash 92. The track 72 has a skewed linear slot 100 therein located intermediate the slots 82 and 84. That is, the slot 100 has a longitudinal axis which forms an acute included angle with the plane of the window 12 and with the longitudinal axes of the slots 82 and 84. The ball fixture 90 has its stem extending through the slot 100 and with its spherical ball 94 engaging the track 72 along its edge defining the slot 100.

In addition, the track 72 at its end adjacent the pillar 32 has a transverse or perpendicular slot 102 therethrough. The slot 102 has a longitudinal axis which is normal to the longitudinal axis of the slots 82 and 84 and which is normal to the plane of the glass 12. Received through the slot 102 is a pivot pin means 73. The pivot pin means 73 is secured to the ear 42 of the hinge member 40 and extends upwardly therefrom and through the slot 102. The axis of the pivot pin means 73 is normal to the direction movement of the guide track 72.

The operation of the operating mechanism 70 will now be described. When the vehicle door assembly 10 is in its closed position, as shown in FIG. 2, the operating mechanism 70 and the window 12 have the position shown in the solid lines in FIG. 5. In this position, the window 12 is in its innermost position, as shown by the solid lines in FIGS. 4 and 5, and the track 72 is disposed so that the leftmost ends of the slots 82 and 84 are adjacent the retainers 84, the ball fixture 90 is located adjacent the leftmost end of the slot 100 and the pivot pin means 73 is located adjacent the lowermost end of the slot 102.

When the door assembly 10 is unlatched and moved from its closed position toward an open position, the door assembly 10 will pivot about its hinge connection with the pillar 32 of the body structure of the vehicle. As the door assembly 10 is pivoted about its hinge means 34 and moved through an arc, the guide track 72 due to its pivotal connection 73 with the hinge member 40 is caused to be cammed toward the left, as viewed in FIG. 5, since the engagement between the pivot pin 73 and the side of the slot 102 adjacent the hinge member 42 will cause the track 72 to be moved toward the left. During this movement the track 72 slides relative to the retainers 84. As the track 72 is caused to be moved toward the left during opening movement of the door assembly 10, the track 72 via its edge defining the skewed slot 100 will cause the ball fixture 90 to be cammed inwardly (moved toward the inner door panel 24), which in turn will cause the window 12 to be pivoted about its pivots 66 outwardly of the door assembly 10. This movement is depicted in FIG. 4 which shows the glass as it is moved from its innermost position, as shown by the solid lines therein, towards its intermediate and then leftmost phantom line positions. The extent of the leftward movement of the track 72 is depicted by the phantom lines for the slots 82 and 100 in FIG. 5. When the door assembly 10 is in its fully open position, i.e., 90° from its closed position, the ball fixture 90 will be located adjacent the innermost end of the slot 100 adjacent the inner door panel 24, and the pivot pin means 73 will be located adjacent the opposite end of the slot 102 in the track 72, as shown by the phantom lines in FIG. 5.

When the door assembly 10 is again moved toward its closed position, the window 12 is caused to be moved and pivoted in a reverse direction from the leftmost phantom line position shown in FIG. 4 to the solid line position shown in FIG. 4.

It should be apparent from the foregoing, that a novel, simple, economical and totally mechanical operating mechanism has been provided for pivoting a side window in response to movement of the door assembly between its open and closed positions.

Although the illustrated embodiment thereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. In an automotive vehicle having body structure defining a door opening, a door assembly which is hingedly connected with said body structure via a hinge means for movement between a closed position in which the door assembly closes said opening and is aligned with said vehicle and an open position in which the door assembly extends transversely of said vehicle to permit entry into and exit from said vehicle, the improvement being that said door assembly includes a window which is pivotally supported by a pivot means for movement about a generally horizontal axis between inner and outer positions, said axis being fixed in position relative to a lower part of said door assembly during said movement, and an operating mechanism including a movable member operatively connected with said window and with said body structure for automatically effecting pivotal movement of said window from its inner position towards its outer position in response to movement of the door assembly from its closed position towards its open position so that said window is disposed out of the way to permit ease of entry into the vehicle when the door assembly is open and for automatically effecting pivotal movement of said window from its outer position towards its inner position in response to movement of the door assembly from its open position towards its closed position so that the window closes off said opening when the door assembly is closed.

2. In an automotive vehicle having body structure defining a door opening, a door assembly which is hingedly connected with said body structure via a hinge means for movement between a closed position in which the door assembly closes said opening and is aligned with said vehicle and an open position in which the door assembly extends transversely of said vehicle to permit entry into and exit from said vehicle, the improvement being that said door assembly includes a window which is pivotally supported by a pivot means for movement about a generally horizontal axis between inner and outer positions and an operating mechanism including a guide track slidably supported for linear movement by a panel of the door assembly and which is pivotally and slidably connected with the window and pivotally and slidably connected with a hinge member of the hinge means on the body structure of the vehicle for automatically effecting pivotal movement of the window from tis inner position towards its outer position in response to movement of the door assembly from its closed position towards its open position so that said window is disposed out of the way to permit ease of entry into the vehicle when the door assembly is open and for automatically effecting pivotal movement of said window from its outer position towards its inner position in response to movement of the door assembly from its open position towards its closed position so that the window closes off said opening when the door assembly is closed.

3. In an automotive vehicle having body structure defining a door opening, a door assembly which is hingedly connected with said body structure via a hinge means for movement about an axis between a closed position in which the door assembly closes said opening and is aligned with said vehicle and an open position in which the door assembly extends transversely of said vehicle to permit entry into and exit from said vehicle, the improvement being that said door assembly includes a support panel, a window which is pivotally supported by a pivot means carried by said support panel for movement about a generally horizontal axis between inner and outer positions and an operating mechanism carried by said support panel and including a guide track slidably supported for linear movement and which is pivotally and slidably connected with the window and pivotally and slidably connected with a pivot pin on a hinge member of the hinge means on the body structure of the vehicle for automatically effecting pivotal movement of the window from its inner position towards its outer position in response to movement of the door assembly from its closed position towards its open position so that said window is disposed out of the way to permit ease of entry into the vehicle when the door assembly is open and for automatically effecting pivotal movement of said window from its outer position towards its inner position in response to movement of the door assembly from its open position towards its closed position so that the window closes off said opening when the door assembly is closed, said guide track being slidably supported on a pair of spaced apart support members secured to said support panel, said guide track having a first pair of linearly extending slots therethrough overlying said support members and being slidably retained on the support members via retainers extending through the slots, a second skewed through a slot whose longitudinal axis forms an acute included angle with respect to the longitudinal axes of said first pair of linearly extending slots and which is located intermediate the first pair of slots and a third end slot extending transversely of said first pair of slots and through which said pivot pin carried by said hinge member of the hinge means extends, a ball fixture extending through said skewed slot and connected with said window, said pivot pin on said hinge member causing said guide track to be linearly moved and said ball fixture to move toward said support panel to pivot said window outwardly in response to the door assembly being moved from its closed position toward its open position.

4. In an automotive vehicle, as defined in claim 3, and wherein said pivot pin carried by said hinge member of said hinge means has an axis which is laterally offset from the axis of the hinge means.

5. In an automotive vehicle, as defined in claim 4, and wherein said ball fixture comprises a spherical ball having a threaded stem which extends upwardly through said skewed slot in said track and is threadably connected with a sash secured to the lower end of said window.

* * * * *